United States Patent [19]

Larkin

[11] 3,771,376

[45] Nov. 13, 1973

[54] DRIVE MECHANISM
[75] Inventor: Artemas M. Larkin, Glendale, Calif.
[73] Assignee: Lockheed Aircraft Corporation, Los Angeles, Calif.
[22] Filed: Jan. 31, 1972
[21] Appl. No.: 221,961

[52] U.S. Cl. .................... 74/96, 292/223, 292/217
[51] Int. Cl. ........................................... F16h 21/44
[58] Field of Search ...................... 74/96, 579, 583; 292/217, 214, 196

[56] References Cited
UNITED STATES PATENTS

| 1,046,072 | 12/1912 | Jones | 292/223 |
| 1,907,430 | 5/1933 | Mears et al. | 292/217 |
| 3,267,752 | 8/1966 | Hauser-Bucher | 74/96 |
| 2,837,363 | 6/1958 | Eichner | 292/217 |
| 2,197,256 | 4/1940 | Kucera | 74/579 |
| 2,358,146 | 9/1944 | Clute | 74/96 |
| 2,512,380 | 6/1950 | Quartullo | 74/96 |
| 3,401,569 | 9/1968 | Boyd | 74/96 |

Primary Examiner—Charles J. Myhre
Assistant Examiner—Wesley S. Ratliff, Jr.
Attorney—Frank L. Zuegelter et al.

[57] ABSTRACT

A mechanism for locking a door or other device and comprising two members each preferably cylindrical, having their respective longitudinal axes oriented perpendicular to each other, a connecting swivel link between such members, and elements, such as clevises, and rotatable about an axis normal to the longitudinal axis of the respective member to which it is mounted, providing the necessary swinging movement to the swivel link as the members are rotated about their respective axes and between alternate positions. As the first of such members functions as a driving member by rotation about its longitudinal axis, the other, or driven, of such members correspondingly rotates about its longitudinal rotatable elements and the axis. When the axis of the swivel link are caused to lie in a plane containing the longitudinal axis of the driving member, the driven member cannot be rotated by other than the driving member; thus, in effect, locking the mechanism in such position.

14 Claims, 6 Drawing Figures

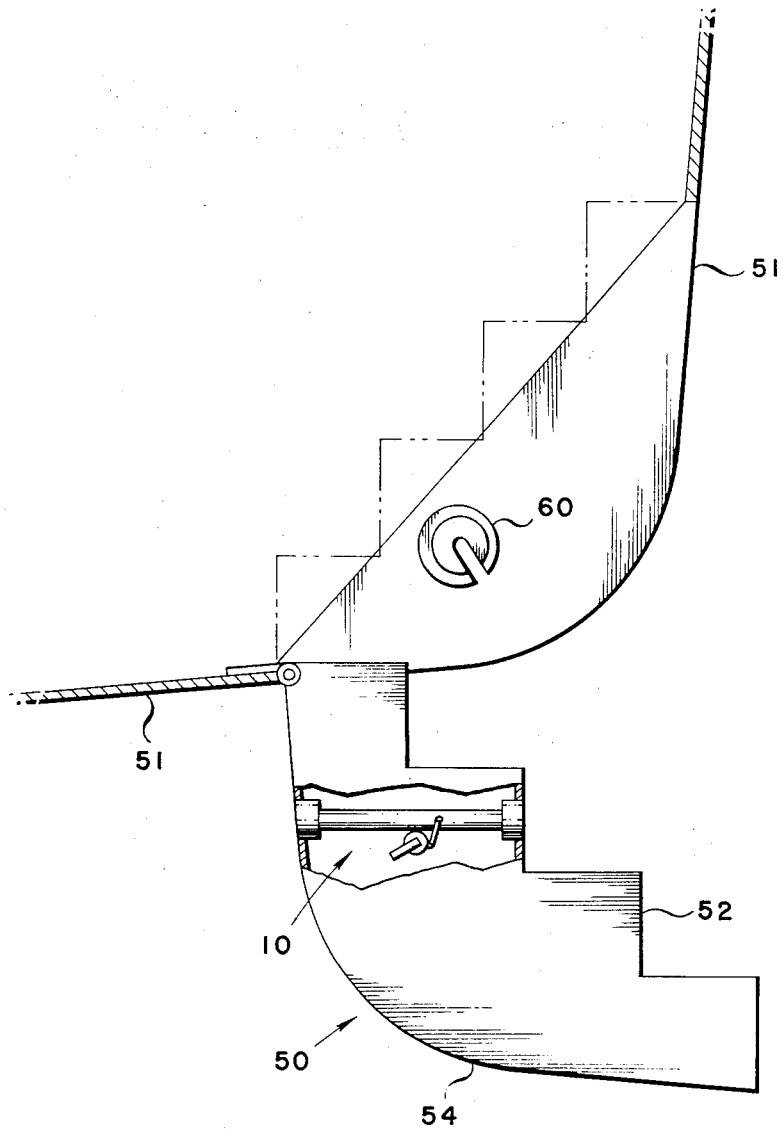
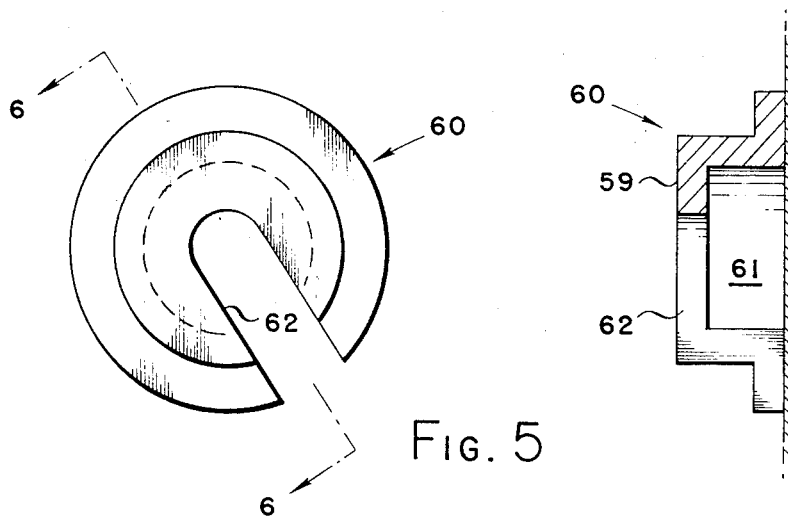
Fig. 4
Fig. 5
Fig. 6

DRIVE MECHANISM

STATEMENT OF GOVERNMENT INTEREST

The invention herein described was made in the course of or under a contract with the Department of the Navy.

BACKGROUND OF THE INVENTION

1. Field of the Invention

This particular invention was perfected as a result of developing a secondary safety lock for an aircraft cabin access door capable of being released from inside or outside of the aircraft. The scope of the invention is applicable to numerous and varied mechanisms which require an oscillatory input or output motion, or in any environment in which it is desired to have one position of a member, shaft, or the like, locked, in effect.

2. Description of the Prior Art

Heretofore, gear trains and cams have been utilized in regard to driving the mechanical structure for safety locking devices on doors of aircraft or other closures. These articles are heavy, complicated in structure and operation, and expensive to make. Furthermore, cams or gears are sensitive to their particular positions in a mechanical mechanism, whereas this invention has the advantage of not requiring such sensitivity to maintain a locked position for a device embodying the invention.

U.S. Pat. Nos. 723,975; 2,071,787; 2,197,256 and 3,401,569 are illustrative examples of mechanisms including linkages through which oscillatory motion is produced.

3. Problems in the Prior Art

The special cams or gears utilized in aircraft doors involve complex designing and fabrication in order to achieve the object of a secondary safety lock for the door. Also, although the weight of an embodiment of this invention could be (but not likely) comparable to the weight of cams or gears utilized in the door structure, the latter involve a larger volumetric envelope within the dimensions of the door.

SUMMARY OF THE INVENTION

This invention is directed generally to a mechanism capable of rotating and/or locking other structure or elements, and is particularly related to a locking mechanism for use on doors.

An object of this invention is to provide a simplified, inexpensive, efficient and expedient way to rotate one structure relative to a second structure.

Another object of this invention is to provide a novel manner of locking in one position a driven shaft, cylinder, or other member to which attached other structure is thereby also positioned.

A further object of this invention is to provide a reduction in volumetric space otherwise required for similar locking devices which may include gears, cams or the like.

Another object of this invention is to provide an oscillatory input and output motion by a linkage mechanism not heretofore obtained in other or similar mechanisms.

Another object of the invention is to minimize or negate any mechanical advantage in or for the driven member, shaft, or the like, so as to achieve a truly dead or lock position therefor.

These and other objects and advantages of the invention will become more fully apparent upon a reading of the following description, the appended claims thereto, and the accompanying drawing.

BRIEF DESCRIPTION OF THE DRAWING

FIG. 4 is a view, partly in cross-section, of an access door, in alternate positions, hinged upon accompanying wall structure, with the invention being incorporated within the door frame thereof;

FIG. 5 is a plan view of a bracket or the like usable with the installation of an embodiment of the invention; and FIG. 6 is a view taken on line 6—6 of FIG. 5.

DESCRIPTION OF THE PREFERRED EMBODIMENT

Figures 1, 2:
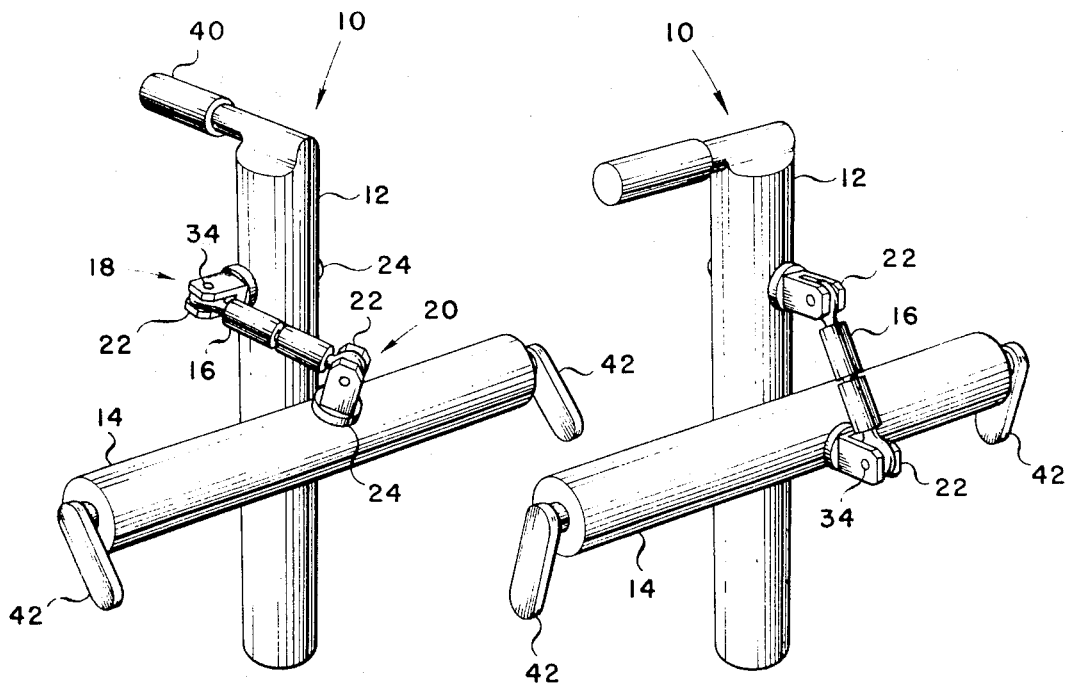
FIG. 1 is a full perspective view of an embodiment of the invention.
FIG. 2 is a full perspective view of the same embodiment but with its members in a rotated position after actuation thereof has occurred.

Referring now to the drawing in which reference characters correspond to like numerals set out in the following description, the reference character 10 illustrates an embodiment of the invention. The embodiment or mechanism 10 comprises a first member 12, preferably cylindrical, such as a shaft, or the like, having its longitudinal axis aligned, say, in a vertical manner for purposes of explanation, a second member 14 oriented perpendicular to the member 12 and having its longitudinal axis aligned, say, in a horizontal manner, a swivel means 16 for operatively connecting members 12 and 14 together, and rotating means such as a pair of elements 18 and 20 attaching the members 12, 14 to their swivel means 16, all as shown in FIGS. 1 and 2. Generally, then, it can be said that the members 12 and 14 are arranged normal to each other, but not having their respective longitudinal axes on a common center or plane.

Each rotating element 18, 20 preferably comprises a clevis 22 suitably rotatably mounted on a bearing shaft 24 secured to and extending through its respective member 12, 14, whereby the clevis 22 freely rotating about an axis normal to the axis of its respective associated member 12, 14 on which it is mounted. Preferably, the clevis 18 is mounted along the length of member 12, taking it as the driving force or element of the mechanism 10 in this embodiment, such that the oriented member 14 lies generally half-way along the length of the member 12.

Figure 3:
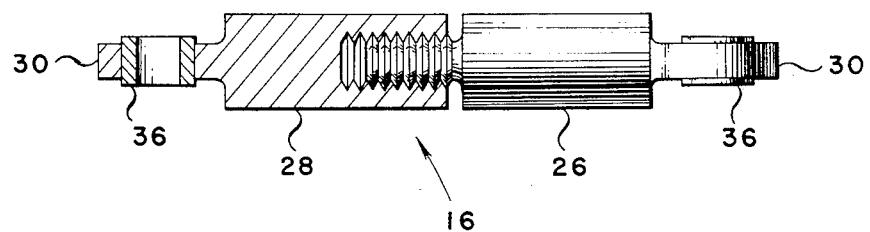
FIG. 3 is a view, partly in section, of a connecting swivel means for the members shown in FIGS. 1 and 2.

Elements constituting the swivel means 16 are joined together in a swivelable manner and preferably comprise male and female rods 26, 28, respectively, their opposing ends 20 prefably flattened or otherwise formed to complement the bifurcation of each clevis 22. Thus, the rods 26, 28 are pinned or attached as at 34 (FIG. 1) to their respective clevises 22. Bearings 36 (FIG. 3) may be mounted in each end 30 for providing anti-friction and additional life to the swivel means 16. The purpose of the swivel means 16 is to provide a turning movement for the rotating elements 18, 20 as it twists about itself and as the members 12, 14 rotate between their alternate positions, as will become further evident hereinafter. Various forms of swivel means, examples of which being bearings, screw threads such as are shown, turnbuckles and swivels, may be utilized.

The assembly of the device 10 should be apparent; however, briefly, the members 12 and 14 are first fabricated from suitable materials, such as tubing, bar stock, wood, plastic, etc.; whatever is suitable for desired requirements. Similarly, the same holds true for all the other elements constituting an embodiment, and different materials may be used for the different elements thereof. After the rotating elements 18, 20 are suitably fabricated and mounted to their respective members 12, 14, the swivel means 16 may be pinned as at 34 to connect or join together both such members. Each member 12, 14 may include the desired configuration for their respective adapting means 40, 42 which, of course, complements or conforms to other structure whose movement is to be controlled by the actuation of the mechanism 10. One or more suitable structural members 40 is securely mounted, such as by welding, or pinning, to the member 12, preferably at either or both of its ends, for rotating it about its axis, and thereby defining it to be the driving element in the mechanism 10. Likewise, suitable structural elements 42, such as latches or dogs, for example, are securely mounted on the member 14, preferably at one or both of its ends, for adaptation to and connection with structure, such as a door 50 shown in FIG. 4, which is to be actuated from between closed and open positions. Thus, member 14 becomes, by definition, the driven element in the mechanism 10.

It should be noted, too, that the invention is not limited to including the bearing shafts 24 for the rotating means 18 and 20, as other expedients may provide a suitable mounting for the rotatable means as well.

In operation, assume a fixed distance between the longitudinal axes of the members 12 and 14. This, of course, may be accomplished by determining the fixation of the means 40 and 42 to other structure to be attached to the mechanism 10. As the driving member 12, as shown in FIG. 1, is rotated about its longitudinal axis by the means 40, its associated clevis 22 rotates about its axis which is maintained in a generally horizontal plane. This motion is passed to the swivel means 16 which in turn pivots about its pins 34, and simultaneously swings generally in the same direction as the rotation for the member 12, and twisting upon itself as it swings, to cause the clevis 22 associated with the cylinder 14 to rotate about its own axis and, simultaneously, causing member 14 to rotate about its own longitudinal axis, the resulting positions for the members 12 and 14, after such actuation, being shown in FIG. 2. The structure suitably mounted to, say, the mounting latches or dogs 42 on member 14 is turned or rotated likewise as is the member 14.

The transversely disposed driven member 14 of the device 10 is now in its position shown in FIG. 2, and cannot feed any independently-actuated motion back to the driving or input member 12 to rotate the device 10 in a reverse manner. In other words, with the swivel means 16 swung and twisted into its position shown in FIG. 2, so that its axis lies in the same plane as the axis of the driving member 12, reverse movement from any motion in the driven member 14, other than by member 12, cannot occur. In this relationship, the mechanical advantage for the driven member 14 either does not exist or is at its minimum, and may be deemed to be in a dead or lock position.

Thus, unless acted upon only by the activation of the means 40 through the member 12, the member 14 remains located in its position as shown in FIG. 2.

To further illustrate this, a detent could be applied to the member 12 or 14 (preferably to member 12) so that any additional structure connected through the means 42 is likewise held in this position. As detents are generally known to be overcome by a minimum manual twisting effort, one might attempt to overcome such detent by actuation of such additional structure. However, such is not the case. It would be through the actuation or rotation of the member 12 only which could override the effect of the detent. In other words, the detent would effectively maintain such additional structure to the transverse cylinder 14 in its dead or lock position (FIG. 2) relative the the member 12 even though a force or motion were amplified here to bear against the member 14.

It should now be evident that member 12 is the driving force or element of the mechanism 10 while the member 14 becomes the driven force or element therein.

It should be understood that the two members 12, 14 may be offset with respect to each other from the centers of their respective longitudinal axes; i.e., the disposition of either member 12 or 14 may be along any point of the longitudinal axis of the other member 14, 12 but within the length of such other member 14, 12. To place such point outside such length denies a coplanar relationship between the swivel means 16 and the longitudinal axis of the driving element or shaft 12, and which relationship constitutes the dead or lock position for the mechanism 10.

It is to be noted also that the invention comprehends an embodiment in which a portion of either or both members 12, 14 may be recessed in order to bring closer together the longitudinal axes of such members 12 and 14, so long as such axes do not have a common intersecting point or place. In other words, to bring such axes close together, one or both of the portions of the members 12, 14 that would otherwise physically abut each other and thus prevent a closer disposition between the axes could be recessed or cut away to provide such a closer disposition.

FIG. 4 illustrates an installation in a door 50 of the invention. The driving member 12 is disposed across the depth of the door 50 which is suitably hingedly secured to aircraft wall structure 51. The driving member 12 is mounted in bearings (not shown) suitably affixed to such wall structure and in which it would be readily rotatable. One or more means 40 then may function as a handle for member 12 or otherwise be suitably affixed to handles (not shown) or the like mounted outside or akin to the inner wall 52 and outer wall 54 of the door 50, so that upon manipulation of either handle, the device 10 is actuated. In the open position for the door 50, the device 10 is disposed in the manner illustrated in FIGS. 1 and 4. To obtain a locked position for the door 50 after it has been closed, the device 10 is actuated by the handle on either wall 52, 54 in order to achieve the disposition of the mechanism as illustrated in FIG. 2, thus, locking the door 50 in closed position. The means 42, such as a dog or latch element attached to necked-down portions on the member 14, such portions corresponding to the width of a flange 59 formed on a bracket 60 which also includes a pocket or cavity 61 for retaining the dog or latch, may be caused to enter a recess 62 of the flanged bracket 60 (FIGS. 5, 6) secured to structure interiorly of the door 50 after which rotation of the driven member 14 causes the dog 42 to seat in the cavity 61 provided in the bracket 60.

Thus, it should now be evident that the input motion provided member 12 is transmitted to a transverse output member 14 by the swivel means 16. The transverse member cannot feed motion back to the input member 12 when the swivel means position is co-planar with the longitudinal axis of the input member 12. While the swivel means and input member 12 occupy this relationship, the greatest mechanical advantage (in terms of force rather than motion amplification) occurs. Thus, for example, a detent applied to the transverse member 12 can be overcome by a minimum manual twisting effort and yet be most effective in maintaining the transverse member 14 in a zero feedback dead position. This concept has application as a part of numerous mechanisms which require an oscillatory input and output motion.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. A drive mechanism having a dead position and comprising in combination,
    a pair of members each of which has a longitudinal axis not having a common center with the other such axis, and being in perpendicular orientation with respect to each other,
    means for rotating on each of said members mounted on each of said members, each said rotating means having its axis normal to the longitudinal axis of its corresponding one of said members, and
    swivel means including at least two elements twistable about each other, and being pivotally attached to and operatively connecting together said rotating means,
    whereby upon one of said members being defined as a driving element, rotation of such element about its longitudinal axis swings and twists said swivel elements so as to cause the other of said members to be rotated about its longitudinal axis from its corresponding position to an alternate position deemed to be its dead position in which it is locked and not rotatable therefrom about its axis unless caused to do so only by rotation of the driving element,
    the axis of said swivel means being co-planar with the longitudinal axis of the driving element in the dead position for said other of said members.

2. The mechanism of claim 1 including means attached to each of said members for connection to other additional structure.

3. The mechanism of claim 1 wherein at least one of said rotating means comprises a clevis rotatably mounted on a bearing shaft, said bearing shaft secured to and extending through a member of said members.

4. The mechanism of claim 1 in which said swivel means includes means on end of its elements for pivotally connecting the swivel means to said rotating means.

5. The mechanism of claim 4 wherein said swivel means comprises male and female rods threaded together but twistable about each other.

6. The mechanism of claim 5 in which said pivotally connecting means comprises flattened segments each of which having an aperture therein.

7. The mechanism of claim 5 in which bearings are mounted in said pivotally connecting means.

8. The mechanism of claim 4 in which said pivotally connecting means comprises flattened segments each of which having an aperture therein.

9. The mechanism of claim 8 including bearings mounted in said flattened segments.

10. The mechanism of claim 1 in which
    said rotating means comprises clevises rotatably mounted on bearing shafts, each of which shafts is secured to and extends through its respective member, and
    said two elements comprise male and female rods joined together in a twistable manner and with means formed on the opposing ends of said rods for pivotally connecting the swivel means to said clevises.

11. The mechanism of claim 10 in which said pivotally connecting means comprises flattened segments each of which having an aperture therein.

12. The mechanism of claim 11 including bearings mounted in said flattened segments.

13. The mechanism of claim 1 in which each of said rotating means comprises a clevis rotatably mounted on a bearing shaft, said bearing shaft secured to and extending through each of said members.

14. The mechanism of claim 10 wherein said male and female rods are threaded to each other.

* * * * *